United States Patent [19]
Krtolica

[11] Patent Number: 5,974,177
[45] Date of Patent: Oct. 26, 1999

[54] APPARATUS AND METHOD OF NETWORK DISTRIBUTION OF RECORD DATA USING TRANSMITTAL SYMBOLS HAND ENTERED ON A TRANSMITTAL SHEET

[75] Inventor: Radovan V. Krtolica, Mountain View, Calif.

[73] Assignee: Canon Kabushiki Kaisha, Tokyo, Japan

[21] Appl. No.: 09/023,532

[22] Filed: Feb. 13, 1998

Related U.S. Application Data

[62] Division of application No. 08/567,763, Dec. 5, 1995.

[51] Int. Cl.⁶ ........................................ G06K 9/46
[52] U.S. Cl. .................... 382/202; 358/403; 382/224; 382/317
[58] Field of Search ....................... 382/179, 185, 382/186, 187, 188, 189, 202, 317, 203, 209, 224, 286; 358/403, 402, 464

[56] References Cited

U.S. PATENT DOCUMENTS

| | | | |
|---|---|---|---|
| 3,539,994 | 11/1970 | Clapper | 382/215 |
| 4,829,583 | 5/1989 | Monroe et al. | 382/185 |
| 4,893,333 | 1/1990 | Baran et al. | 379/100 |
| 5,065,446 | 11/1991 | Suzuki et al. | 382/253 |
| 5,113,452 | 5/1992 | Chatani et al. | 382/187 |
| 5,126,858 | 6/1992 | Kurogane et al. | 358/450 |
| 5,247,591 | 9/1993 | Baran | 382/317 |
| 5,479,530 | 12/1995 | Nair et al. | 382/202 |
| 5,579,408 | 11/1996 | Sakaguchi et al. | 382/187 |
| 5,719,969 | 2/1998 | Taguchi | 382/216 |

FOREIGN PATENT DOCUMENTS

| | | | |
|---|---|---|---|
| 0 034 941 A1 | 9/1981 | European Pat. Off. | H04N 1/00 |
| 0 640 934 A2 | 3/1995 | European Pat. Off. | G06K 9/64 |

OTHER PUBLICATIONS

Baran et al., Dot Constrained Hand Printed Character Recognition System and Method, filed Aug. 3, 1990, pp. 1–25, Figs. 1–17, SN 08/102,101 as incorp by ref in USP 5,247,591.

*Primary Examiner*—Amelia Au
*Assistant Examiner*—Timothy M. Johnson
*Attorney, Agent, or Firm*—Paul Hentzel

[57] ABSTRACT

Document distribution system 10 receives user record documents 10R containing record data 10D for distribution and storage throughout a user network 10N. Controller 10C controls the operation of the document distribution system. A transmittal sheet 10T carrying transmittal symbol accompanies each record document for directing the distribution. Document scanner 10S has a document port 10P for receiving the user documents and transmittal sheets. The document scanner is responsive to the controller for scanning the transmittal symbols on the transmittal sheet and the record data on the documents. The scanner provides an electronic pixel image of the record data for distribution and storage throughout the user network. The scanner also provides a pixel image of the transmittal symbols for directing the distribution and storage. Controller display 12 is responsive to the controller for displaying operational information about the document distribution system to the user. User response device 14 is connected to the controller for permitting the user to initiate and operate the document distribution system.

16 Claims, 6 Drawing Sheets

APPARATUS AND METHOD OF NETWORK DISTRIBUTION OF RECORD DATA USING TRANSMITTAL SYMBOLS HAND ENTERED ON A TRANSMITTAL SHEET

This application is a divisional application of parent application Ser. No. 08/567,763, filed Dec. 5, 1995, which parent application is pending.

TECHNICAL FIELD

This invention relates to hand entered transmittal symbols carried on a transmittal sheet for directing the network distribution of record data on a record document, and more particularly to guide constraints printed on the transmittal sheet for guiding the user during the hand entry.

BACKGROUND

Heretofore information has been hand entered into forms by placing an "X" or a check (or even just a smudge) within a box, indicating the selection of a particular option offered by the form. The entries on the form were then reviewed by a clerk (or scanned by a data processing system). The clerk (or computer) merely detected the presence or absence of an entry in the box next to each option, regardless of the shape of the hand entered marks. This prior "fill in the box" approach is a single symbol technique, incapable of supporting complex options involving a set of different hand entered symbols.

Bar codes have been employed on labels for processing documents. However bar codes are not generally human readable, and do not offer the human interface convenience and flexibility of hand entered symbols.

Multiple symbol data has been hand entered into a string of box sites. The writer prints each character of routine information such as his name and address into a separate box site. The box sites located and confined the characters, which assisted in line and character segmentation. However, the lack of a uniform hand printing font among various writers creates complex OCR problems.

US patent x,xxx,xxx issued Month Day, Year (application Ser. No. 08/524,996 filed Sept. 8, 1995) and assigned to the present assignee, teaches a data entry system for distributing record data throughout a user network. Transmittal information for directing the distribution is presented to the system on a magnetic disk which is read by the system through a disk drive.

SUMMARY

It is therefore an object of this invention to provide an apparatus and method of network distribution of record data involving guide constraints on a transmittal sheet for receiving hand entered transmittal symbols which direct the distribution.

It is another object of this invention to provide such an apparatus and method in which guide constraints define the individual stroke elements forming the transmittal symbols.

It is a further object of this invention to provide such an apparatus and method in which the presence or absence of individual stroke elements are detected.

Briefly, these and other objects of the present invention are accomplished by providing electronic network distribution of record data. A record document is provided containing record data to be electronically distributed. Next a transmittal sheet is provided carrying hand entered transmittal symbols which direct the distribution. The transmittal symbol are hand entered within pre-existing guide constraints present on the transmittal sheet for guiding the entry of the symbols. The guide constraints establish the position and length and direction of stroke elements which define a finite set of transmittal symbol stroke patterns. The transmittal sheet and record document are scanned with a scanner to obtain an electronic pixel image of the transmittal symbols carried on the transmittal sheet and the record data contained in the record document. The pixel image of the transmittal symbols is classified using OCR techniques against a stroke pattern library including at least some stroke patterns of the finite set of stroke patterns. The electronic pixel image of the record data is distributed as directed by the classified transmittal symbols.

BRIEF DESCRIPTION OF THE DRAWING

Further objects and advantages of the guide constraints and the distribution of record data will become apparent from the following detailed description and drawing (not drawn to scale) in which.

The first digit of each reference numeral in the above figures indicates the figure in which that element is most prominently shown. The second digit indicates related structural elements, and the final letter indicates a sub-portion of an element.

Figures 1A, 1B:
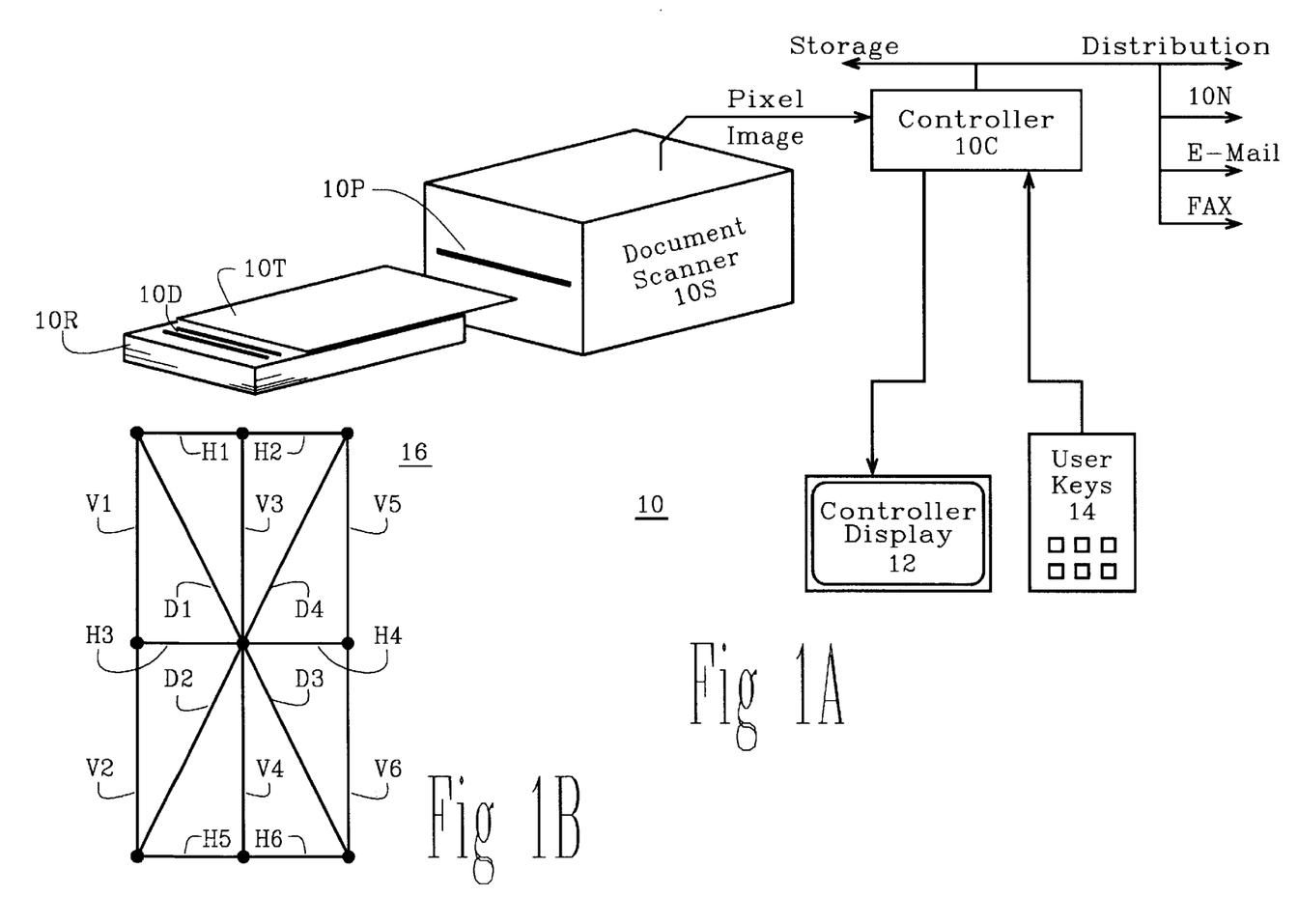
FIG. 1A is a diagram of the data distribution system showing a document scanner, a controller, and a distribution network.
FIG. 1B is a schematic diagram of a star embodiment of a guide constraint employed on the transmittal sheet of FIG. 1A.

GENERAL SYSTEM—(FIG. 1A)

Document distribution system 10 receives user record documents 10R containing record data 10D for distribution and storage throughout a user network 10N. Controller 10C controls the operation of the document distribution system. The components of controller 10C are further shown and described in connection with FIG. 6. A transmittal sheet 10T carrying transmittal symbols accompanies each record document for directing the distribution. Document scanner 10S has a document port 10P for receiving the user documents and transmittal sheets. The document scanner is responsive to the controller for scanning the transmittal symbols on the transmittal sheet and the record data on the documents. The scanner provides an electronic pixel image of the record data for distribution and storage throughout the user network. The scanner also provides a pixel image of the transmittal symbols for directing the distribution and storage.

Controller display 12 is responsive to the controller for displaying operational information about the document distribution system to the user. User response device 14 is connected to the controller for permitting the user to initiate and operate the document distribution system. User network 10N may be any suitable collection of computer stations and archival storage such as a local area network (LAN) or a wide area network (WAN). The data transmission of the network may be any suitable electronic format such as facsimile (fax), electronic mail (E-mail), file transfer, remote access, etc.

GUIDE CONSTRAINTS—(FIG. 1B)

The transmittal symbols are hand entered into guide constraint 16 printed on transmittal sheet 10T. Each guide constraint is a character frame for receiving the stroke elements forming each character. The constraints present stroke sites to the user for guiding the hand entry of the transmittal symbols. The guide constraints determine the position and length and direction of each stroke element forming the transmittal symbol entered therein.

The star embodiment guide constraint (shown in FIG. 1B) has 16 stroke sites suitable for alpha-numerics. Six of the stroke sites (H1, H2, H3, H4, H5 and H6) have a horizontal orientation. Six of the stroke sites (V1, V2, V3, V4, V5, and V6) have a vertical orientation. The remaining four of the stroke sites (D1, D2, D3, and D4) have a diagonal orientation. The star guide constraint has nine stroke endpoints or nodes (shown as dots) arranged in a three row/column matrix.

The stroke sites guide each hand entered stroke element along a straight line extending in either the horizontal, the vertical or the diagonal orientation to form a straight line stroke pattern. Each stroke element connects two endpoints. The stroke marks drawn in by the user must be placed within a stroke site of the guide constraint in order to be processed as a stroke element. A straight mark drawn by the user may form a single stroke element connecting two endpoints, or two stroke elements connecting three endpoints in a straight line.

Finite Set of Stroke Patterns

Each guide constraint presents "N" stroke sites for guiding the hand entry of the transmittal symbols to form a stroke pattern therein. In the star guide constraint embodiment of FIG. 1B, N equals 16. The N stroke sites define "N" corresponding stroke elements of a finite set of transmittal symbol stroke patterns having two to the Nth stroke patterns. The 16 stroke sites of the FIG. 1B star embodiment has 65,536 (2 to the 16th) stroke patterns. One stroke pattern has all 16 stroke elements. All of the remaining stroke patterns have less than 16. Some of these remaining patterns, particularly the ones with few stroke elements, represent the characters of conventional alpha-numeric fonts. Most of the patterns are non-standard, and not associated with any particular letter or number. The stroke patterns are stored in a library, and used during the classification of the transmittal symbols (see FIG. 2). Other guide constraints formats may be employed to provide a different selection of stroke patterns. Formats with more nodes and/or more diagonals provide more strokes and yield transmittal symbols which look more like a conventional font.

The star guide constraint of FIG. 1B has eight perimeter guide sites arranged in a perimeter rectangle and eight interior guide sites arranged in a star formation within the perimeter rectangle. The perimeter guides sites contain the transmittal symbol and define the perimeter stroke elements permitted by the stroke pattern set. The perimeter guides are formed by bottom horizontal edge (elements H5 and H6),
top horizontal edge (elements H1 and H2),
left vertical edge (elements V1 and V2), and
right vertical edge (elements V5 and V6). The interior guides define the interior stroke elements permitted by the stroke pattern set. The interior guides are formed by:
central horizontal line (elements H3 and H4) extending from the left vertical edge to the right vertical edge,
central vertical line (elements V3 and V4) extending from the bottom horizontal edge to the top horizontal edge,
positive slope diagonal line extending from the lower left corner of the perimeter rectangle to the upper right corner, and
negative slope diagonal line extending from the upper left corner of the perimeter rectangle to the lower right corner.

The eight interior guides meet at a common central point proximate the center of the perimeter rectangle.

Figure 2:
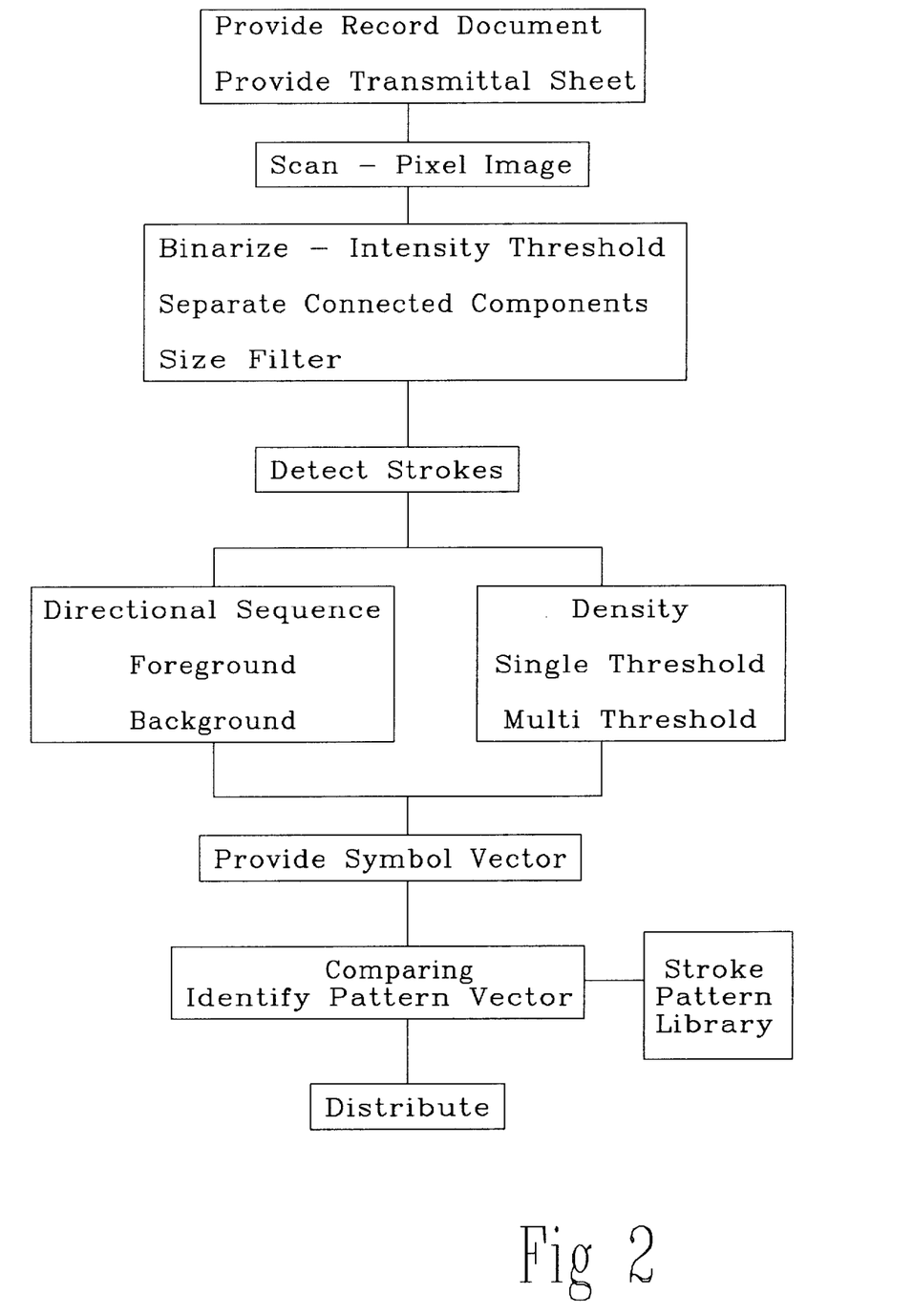
FIG. 2 is a chart showing the steps of the method of classifying the hand entries and distributing the record data using the system of FIG. 1A.

STEPS OF METHOD—(FIG. 2)

A method for electronic network distribution of record data is shown in FIG. 2, and comprises the following basic steps.

Providing a record document means containing record data to be electronically distributed. The record document means may be a single document or a plurality of documents in a stack to be scanned. Each document in the stack may have a single page of record data or many pages.

Providing a transmittal sheet means carrying hand entered transmittal symbols for directing the distribution of the record data. The transmittal symbols have been hand entered by the user within pre-existing guide constraints on the transmittal sheet. The transmittal sheet means may be one sheet or a plurality of sheets. The transmittal sheet is preferably located on top of the record document and is scanned before the record document. If the record document is a plurality of record documents, the transmittal sheets may be located between the record documents for separating the record documents during the scanning step. Alternatively, the transmittal sheets may be located together anywhere in the stack, with the sequence of the record documents and number of sheets of each record document identified on the transmittal sheets. The record documents and transmittal sheets may be made of ordinary paper or any other medium capable of retaining print and hand entered marks.

Scanning the transmittal sheet(s) and the record document(s) with the scanner to obtain an electronic pixel image of the transmittal symbols. The pixel image has foreground pixels and background pixels. The image of each transmittal symbol is defined by foreground pixels contrasted against background pixels. The scanning step also obtains an electronic pixel image of the record data contained in the record document.

Classifying the electronic pixel image of the transmittal symbols using OCR techniques against a stroke pattern library which includes at least some stroke patterns of the finite set of stroke patterns. The stroke patterns in the library may be templates, in which case the OCR techniques employed in the classifying step are template based. Alternatively, the stroke elements in the stroke pattern library may be features, in which case the OCR techniques are feature based.

Distributing the electronic pixel image of the record data as directed by the classified transmittal symbols. The transmittal sheet normally does not contain any record data, and is therefor normally not distributed throughout the user network.

The method of FIG. 2 comprises the following additional steps after the scanning step but before the classifying step.

Binarizing the pixel image of the transmittal symbols into two levels about a foreground/background threshold, one level for foreground pixels and one level for background pixels.

Separating the binarized pixel image into a series of separate foreground connected components. A foreground connected component is a fragment of a pixel image in which each foreground pixel is connected to at least one other foreground pixel within that fragment. Each transmittal symbol normally forms a separate connected component, and touching characters form a single complex connected component. The "connectivity" of the pixels in a connected component may be "strong" or "weak". Pixels can be thought of as vertices of a rectangular (two dimensional) grid. When a pixel is considered to have eight neighbors (2 horizontal, 2 vertical, and 4 diagonal), the four diagonal neighboring pixels are said to be weakly connected if they are similar (both foreground or both background). In contrast, the two horizontal and two vertical pixels are said to be strongly connected. When a pixel is considered to have four neighbors (2 horizontal and 2 vertical), neighboring pixels are said to be strongly connected if they are similar.

Size filtering the connected components based on a minimal bounding envelope for passing the connected components having a size generally the same as the hand entered transmittal symbols to form a size filtered pixel image. Size filtering does not pass connected components having a size not generally the same as the hand entered transmittal symbols. The size filtering may have an upper size threshold for not passing the connected components which are generally larger than the hand entered transmittal symbols such as long dividing lines and borders enclosing large regions of the pixel image. The size filtering have a lower size threshold for not passing the connected components which are generally smaller than the hand entered transmittal symbols. Instructional text printed on the transmittal sheet may be formed by small connected component characters which are below the lower size threshold and are not passed. The guide constraints may be formed by short connected component dashes which are also below the lower size threshold and are not passed. After the size filtering step, only the hand entered transmittal symbol are left in the pixel image for classification. The minimal bounding envelope may be a rectangle defining a first minimum dimension and a second minimum dimension. Preferably, the first minimum dimension extends in the direction of the X axis of the pixel image coordinate system; and the second minimum dimension extends in the direction of the Y axis of the pixel image coordinate system. The minimal bounding rectangle of each connected component may be determined by finding the left most, right most, top most, and bottom most pixels within the connected component. The bounds of the minimal rectangle bounding a connected component are defined by the minimal and the maximal numbers of the pixels rows and columns ("addresses" of extreme pixel positions).

In feature based OCR, the stroke patterns in the library have a matrix data structure with M×N locations, where M is equal to or greater than 2 to the Nth power. Each row is associated with directions for distributing the record data into the user network. Each row is further associated with one of the stroke patterns employed during the classifying step. The stroke patterns are in the form of pattern vectors (matrix rows) having N binary vector elements corresponding to the N stroke elements. The pattern vector elements have one binary state if the corresponding stroke element is present in the stroke pattern for that location, and the other binary state if the stroke element is not present.

The classifying step of the method of FIG. 2 comprises the following additional steps.

Detecting whether a hand entered stroke element has been entered into any of the N stroke sites of the transmittal symbol being classified.

Providing a symbol vector for the transmittal symbol being classified having N binary vector elements corresponding to the N stroke sites. The symbol vector elements have one binary state if a stroke element has been entered into the corresponding stroke site, and have the other binary state if a stroke element has not been entered.

Identifying any pattern vector in the stroke pattern library which is identical to the symbol vector to obtain the directions for distributing the record data.

Complete Library Embodiment

The finite set of stroke patterns has "C" stroke patterns (two to the Nth). The library of stroke patterns may be a complete library having "C" locations, one corresponding to each of the "C" stroke patterns. In addition to uniquely representing the transmittal symbol, the binary symbol vector may also be the address of the corresponding location into the complete library. During the identifying step the address of the symbol vector is accessed in the library to obtain the directions for distribution.

Partial Library Embodiment

The library of stroke patterns may a partial library having "P" locations which is only part of the "C" locations in the complete library. Each of the "P" locations contains a pattern vector corresponding to one of the stroke patterns actually employed as a transmittal symbol on the transmittal sheet. Stroke patterns not employed as transmittal symbols are not required to be in the partial library. During the identifying step the symbol vector is compared with each of the "P" pattern vectors in the library. The directions for distribution are obtained from the location that matches the symbol vector.

Figure 3:
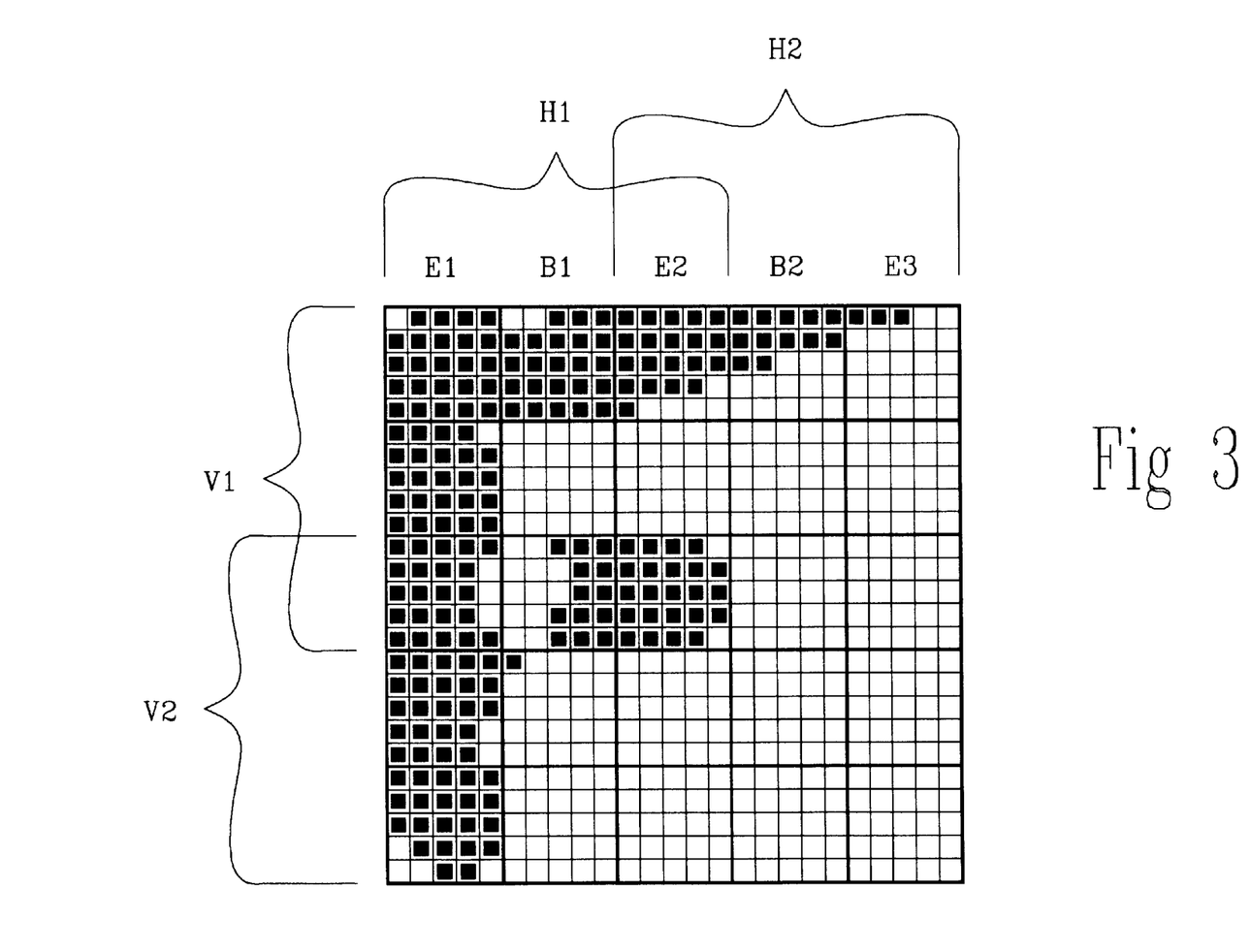
FIG. 3 is a diagram of a pixel map of the transmittal symbol "F" illustrating detection of stroke elements.

STROKE ELEMENT DETECTION—(FIG. 3)

The detection of hand entered stroke elements may be accomplished by the directional foreground sequence test and/or the foreground density test. These tests may be employed separately or in parallel, and are discussed below in connection with FIG. 3. Other tests may be employed to detect stroke sites containing enough foreground pixels to qualify as stroke elements Directional Foreground Sequence The pixels within each stroke site are examined for a sequence of connected foreground pixels extending in the direction of the stroke site. The sequence of foreground pixels must extend at least a predetermined minimum number of pixels "S" in order for the stroke site containing the sequence to be processed as a hand entered stroke element. The value of density "S" in the FIG. 3 example is 9 pixels in a stroke site which is 15 pixels long and 5 pixels wide. Sequences of foreground pixels shorter then "S" pixels in length do not exclude the stroke site from stroke element status based on other tests. Alternatively, the stroke detection may be accomplished by a background exclusion test. The pixels within each stroke site are examined for the presence of background pixels which preclude a directed sequence of "S" connected foreground pixels. Directional sequence detection is not dependent on the density of the foreground pixels within the stroke element.

Foreground Density

The pixels within each stroke site are examined to determine density of the foreground pixels. The foreground density is compared with a predetermined threshold density "D" which must be exceeded in order for the hand entered stroke element to be processed as a stroke element. The value of density "D" in the FIG. 3 example is a simple majority, 38 pixels out of 75 pixels (just over 50%) in a stroke site which is 15 pixels long and 5 pixels wide. Alternatively, the density of background pixels may be determined, which must be less than a predetermined background threshold density. Foreground (background) density detection is independent of the position and sequence direction of the foreground pixels within the stroke element.

Pixel Image Example

The 25×25 pixel image diagram in FIG. 3 shows a transmittal symbol "F" which has been hand entered into the stroke sites of a star guide constraint. The 625 pixels are shown by a grid of light lines. The stroke sites are 5 pixels by 15 pixels and are shown by a 5×5 grid of bold lines. The end nodes of each stroke site are 5 pixels by 5 pixels and overlap with the end nodes of the adjacent stroke sites. The end nodes are connected by a 5 pixel by 5 pixel body forming the middle of each stroke site. Because to the 5 pixel overlap, site H1 (formed by left end node E1, middle body B1 and end node E2) and site H2 (formed by end node E2, middle body B2 and right end node E3) have a combined horizontal dimension of only 25 pixels. The symbol "F" does not contain diagonal features. Therefore, only the horizontal and vertical stroke sites are shown to simplify the example.

The foreground pixels forming the "F" are indicated by a small black square placed within the pixel. The background pixels are empty. The pixel image has a square aspect ratio. The pre-scanned aspect ratio of the FIG. 1B guide constraint was 2:1 (height 2 and width 1) to accommodate the user's preference for tall fonts. The symbol "F" has major imperfections introduced by the user during the hand entry of the marks. Hand entered marks forming transmittal symbols are not crisp and uniform like typed characters. The quality of the marks may be uneven in length, width, orientation, registration, and intensity. The guide constraints compensate for these irregularities by guiding the mark into predetermined stroke sites.

The "F" transmittal symbol is formed by the following three user drawn marks of uneven quality.

1) A main vertical mark (sites V1 and V2) which has been accurately drawn in by the user. Both of these stroke sites have many vertical foreground sequences in excess of 9 pixels, and both have a high foreground density. These two stroke sites qualify as stroke elements under both tests.

2) A top horizontal mark (sites H1 and H2) which has been poorly drawn. This mark is not aligned well with the guide constraint sites H1 and H2. The upper portion of the right end of the top mark is missing. This portion was drawn outside the guide constraint by the user and was not included in the pixel image as part of the transmittal symbol. Stroke site H1 has several horizontal foreground sequences in excess of 9 pixels and has a density of 67 out of 75 (about 89%). This site qualifies as a stroke elements under both tests. Stroke site H2 has two horizontal sequences in excess of 9, but has a density of only 35 out of 75 (about 47%0). Site H2 qualifies as a stroke element under the sequence test but not under the density test.

3) A middle horizontal mark (site H3) which has also been poorly drawn. The middle mark has failed to the main vertical mark. A void remains at the left end of the middle mark. Stroke site H3 does not have any horizontal sequences in excess of 9, but has a density of 58 out of 75 (about 77%). Site H3 qualifies as a stroke element under the density test but not under the sequence test.

Multiple Density Thresholds

The foreground density test may involve multiple thresholds. The two end nodes of each stroke site may have an end threshold density (20 out of 25 or 80% for example), and the middle body may have a lower middle threshold density (10 out of 25 or 40% for example). That is, a foreground pixel in either end node of a site has less effect in the density test than a foreground pixel in the middle body. A body pixel has in effect the same weight as two node pixels. End nodes are common to many adjacent sites and are therefore less determinative of the presence of any individual stroke elements. The middle body however is unique to a single stroke and counts more toward qualifying that site as an element. Both end nodes must meet the high threshold test, and the middle body must meet the low threshold test in order for the site to contain a stroke element.

In the FIG. 3 example, the stroke sites are 5 pixels by 15 pixels, and the end nodes and middle body are 5 pixels by 5 pixels. A more complex example may have shorter middle bodies (3 by 5 for instance), in a 5 pixel by 13 pixel site. The adjacent stroke sites overlap only by one pixel to establish a 25 by 25 pixel matrix.

Optical Filtering

Scanner 10S includes a photosensitive device having an incident light response spectrum. The hand entered transmittal symbols carried on the transmittal sheet have a generally low reflection spectrum within the incident response spectrum. The transmittal symbol forms the foreground of the pixel image because of the low intensity of the reflected light. The transmittal sheet material and the guide constraints have generally high reflection spectrums within the incident response spectrum, and form the background of the pixel image. The scanning is done by establishing relative motion between the photosensitive device and the transmittal sheet. Preferably, the scanning step includes an intensity threshold step which permits the background (the transmittal sheet and the guide constraints) to be distinguished from the foreground (the transmittal symbols). The background is then eliminated from the electronic pixel image on the transmittal sheet.

In addition, the guide constraints may have a reflection spectrum different than the reflection spectrum of the transmittal sheet. This optical difference causes the guide constraints to be visible to the user against the transmittal sheet as the transmittal symbols are hand entered. For example, the guide constraints may be printed in low contrast blue pigment ink, causing a blue the reflection spectrum. The transmittal sheet is typically white and has a white reflection spectrum which contrasts with the blue of the guide constraints.

STORAGE PARAMETERS

The hand entered transmittal symbols direct the distribution of the record data throughout the user network by defining storage parameters for the record data. The primary storage parameter is the storage destination of the record data. This storage parameter may be a network address of the work station to receive the record data, or the pathname of the destination file in archival memory. Another useful storage parameter is the nature or function of the record document of the record data being stored. The storage parameters may include the DPI (dots per inch) image resolution of image record data being stored. High storage DPI provides a clearer image upon retrieval; but requires correspondingly more memory. The selection of the resolution storage parameter may based on how useful and essential the record image is to the user. The storage parameters may also include a future termination date defining the storage life span of the record data being stored. Record data which becomes obsolete with time may be deleted from the archives after a predetermined storage period. Alternatively, the terminated data may be relocated into long term memory such as tape, and preserved in a remote facility. Essential record data may be maintained in memory indefinitely. The hand entered transmittal symbol is not the actual storage parameter, but identifies a location containing the storage parameter in the stroke pattern library. The location may have a description section and a value section. The description section defines the nature of distribution and storage task to be accomplished by the document distribution system (such as distribution of files and storage in archival memory), or the type of data within the key module (such as user identification data). The value section defines the particulars of the distribution parameters and storage parameters, such as memory addresses, file pathnames, network addresses, distribution telephone numbers, folder names, number of documents, database name, or user ID data.

Figure 4:
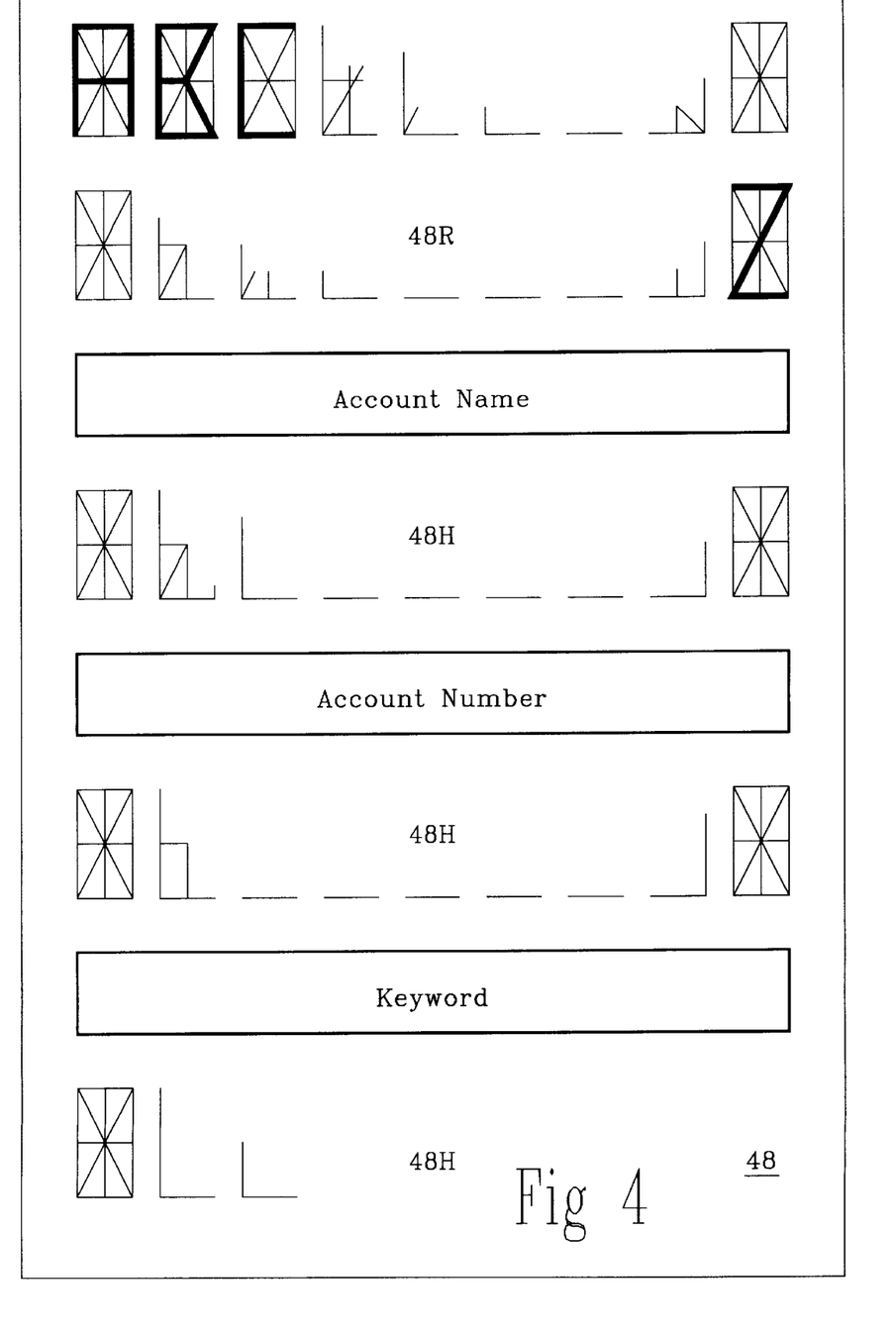
FIG. 4 is a filing embodiment of the transmittal sheet of FIG. 1A.

FILING TRANSMITTAL FORM—(FIG. 4)

The guide constraints may be employed on filing transmittal forms as form 48 (see FIG. 4). These forms receive hand entered transmittal symbols which are scanned and classified, for directing the filing of record data into the user network. Each guide constraint on transmittal sheet 48 is spaced from the surrounding guide constraints for assisting in line and character segmentation of the hand entered transmittal symbols. The guide constraints are arranged in a simple row and column matrix to facilitate the segmentation.

The line and character segmentation may employ horizontal and vertical foreground pixel density projections of the pixel image. The position of the aligned perimeter stroke elements may be determined from the maxima spikes and the known arrangement of guide constraints on the form. The maxima spikes in the projection density onto the horizontal axis of the pixel image indicate the position of the vertical stroke elements of the guide constraints. These maxima spikes are especially prominent for vertical elements V1 and V2 which form the leading vertical mark in many character of common alpha-numeric fonts. The maxima spikes in the projection density onto the vertical indicate horizontal stroke elements. The maxima spikes for horizontal elements H5 and H6 provides a symbol baseline for assisting in horizontal registration during the classifying step.

Reference Symbols

Reference symbols may be printed on the transmittal form, along with the guide constraints. The reference symbols illustrate at least some of the finite set of transmittal symbol stroke patterns. The reference symbols are printed within reference symbol region 48R of the transmittal sheet for visually assisting the hand entry of the transmittal symbols. The guide constraints are printed in a hand entry regions 48H in which the transmittal symbols are hand entered by the user. Each hand entry region guide constraints intended for a group of related transmittal symbols.

The transmittal sheet may have pre-printed instructional text enclosed within a box just above each hand entry region 48H. The text indicates the nature of the directions incorporated in the hand entered transmittal symbols. The embodiment of FIG. 4 shows entry regions for an account name of the destination file, the account number, and keywords concerning the content of the file.

Figure 5:
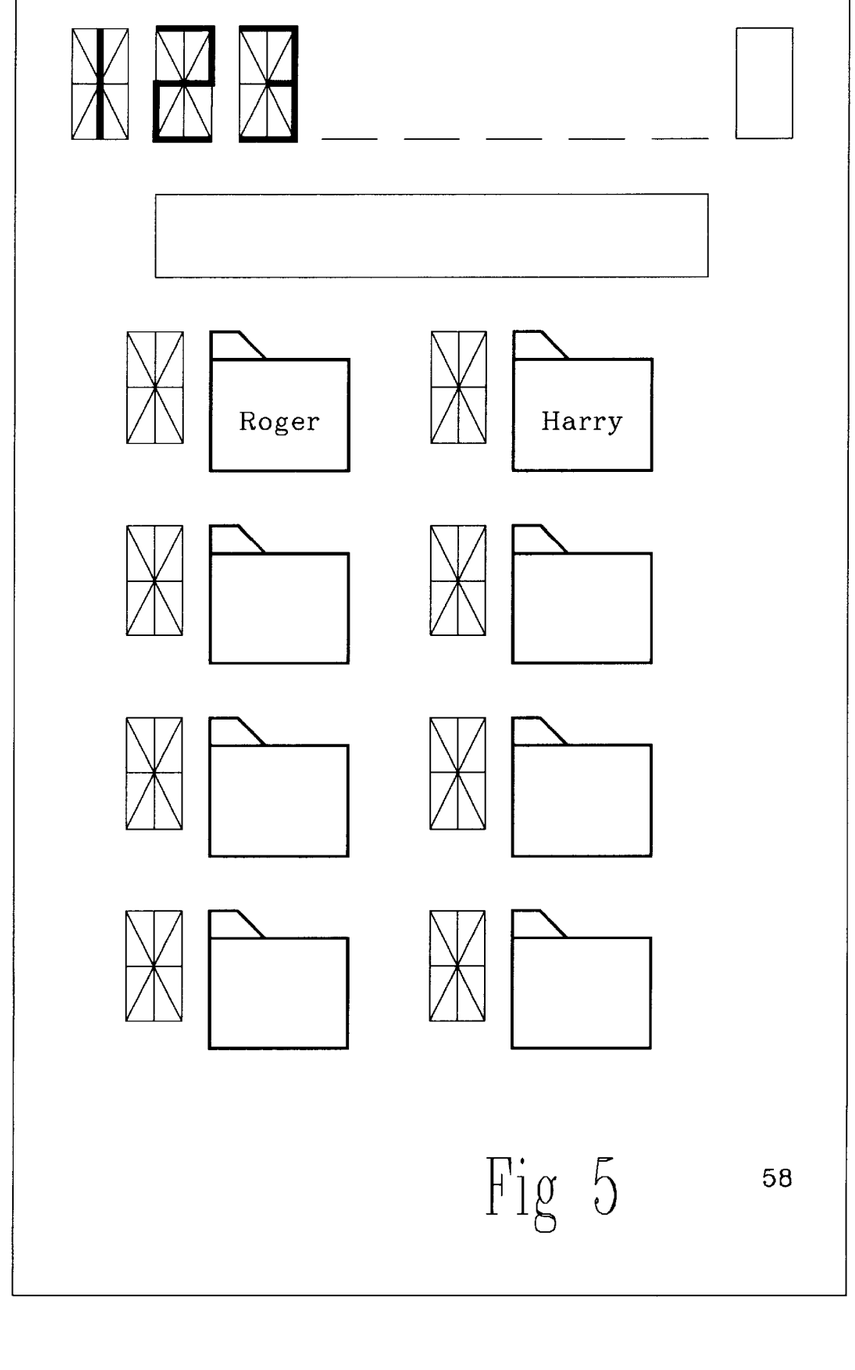
FIG. 5 is a routing embodiment of the transmittal sheet of FIG. 1A.

ROUTING TRANSMITTAL FORM—(FIG. 5)

The guide constraints may be employed on routing transmittal forms such as form 58 (see FIG. 5) which receives hand entered transmittal symbols for routing within the user network. The position of each guide constraints within form 58 defines secondary storage parameters which supplement the primary storage parameters supplied by the user hand entered transmittal symbol in that guide constraint. In form 58 these secondary storage parameters are communicated to the user by text enclosed within an icon symbol next to each guide constraint. The folder icon shown in FIG. 5 signifies to the user that the secondary storage parameter concerns routing destinations. The text may be the name of a person or the title of a project to receive the record data. The secondary storage parameters are communicated to the data distribution system by the horizontal and vertical coordinates of the guide constraints associated with each icon.

Figure 6:
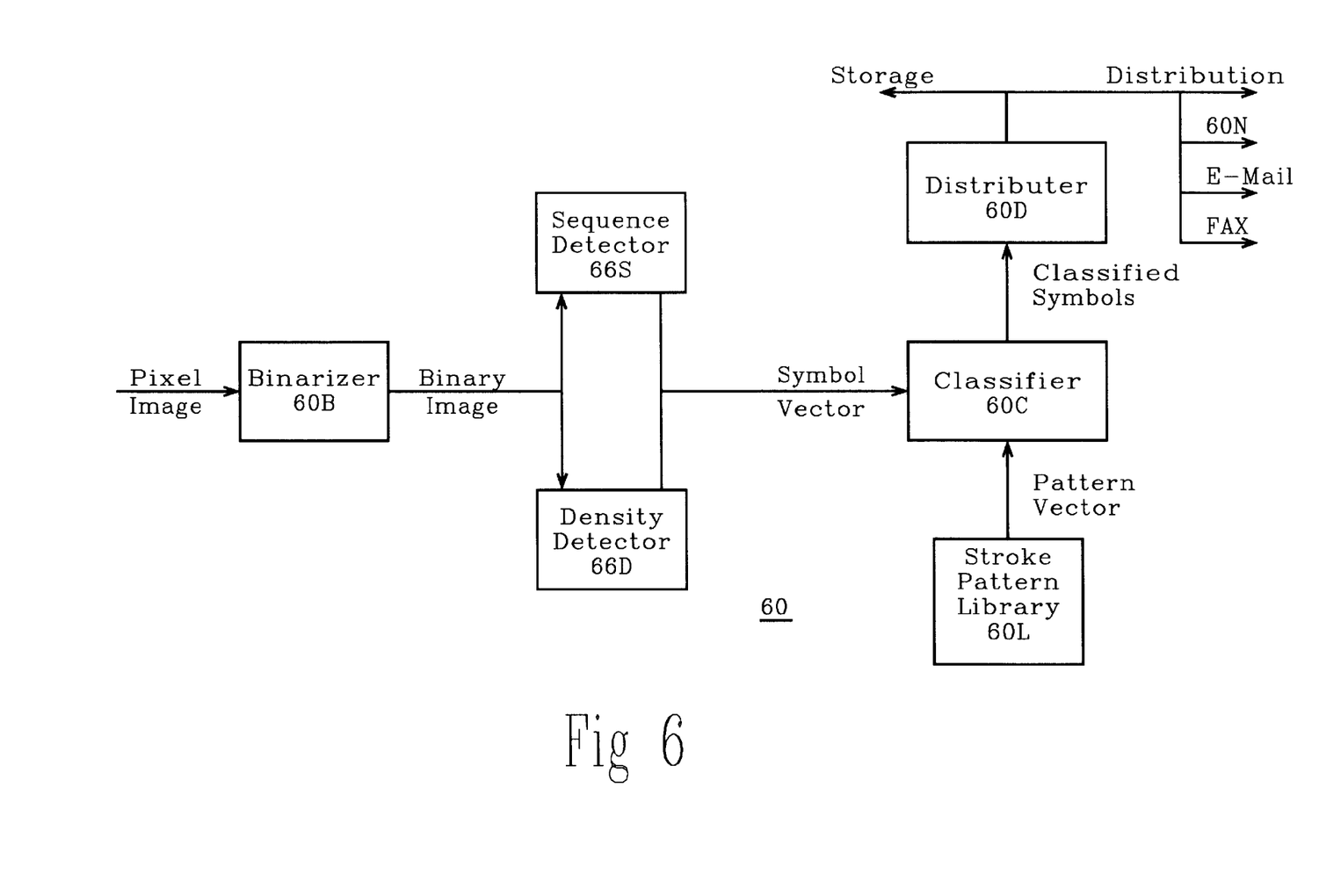
FIG. 6 is a block diagram showing the apparatus required for carrying out the steps of the method.

COMPONENTS OF CONTROLLER 60 (FIG. 6)

The components of controller 60 process and classify the transmittal symbols for distribution the electronic record data into an electronic network. Guide constraints carried on the transmittal sheet receive the hand entered transmittal symbols. Scanner 10S scans the symbol stroke sites within each guide constraint and the symbol stroke elements entered therein, to obtain a pixel image of the transmittal symbols. Binarizer 60B binarizes the pixel image from scanner 10S to provide a binary pixel image. The binarization is across a foreground/background threshold, defining a foreground level for foreground stroke pixels and a background level for background non-stroke pixels.

A stroke element detector detects the pixel image of symbol stroke elements entered into any of the N symbol stroke sites. The detector provides a symbol vector for each guide constraint having N binary symbol vector elements corresponding to the N symbol stroke sites of that guide constraint. Each symbol vector element has one binary state if the pixel image of a symbol stroke element is detected in the corresponding symbol stroke site. Each symbol vector has the other binary state if the pixel image of a symbol stroke element is not detected.

Stroke element detector 66S is a sequence detector which examines the pixels within the pixel image of each symbol stroke site. Sequence detector 66S determines if the symbol stroke site contains a sequence of connected stroke pixels extending at least "S" pixels in the direction of that symbol stroke site. Such a sequence must be present in order to detect a symbol stroke element in that symbol stroke site. In a alternate embodiment, sequence detector 66S determines if the symbol stroke site contains a non-stroke pixels which preclude a sequence of connected stroke pixels extending at least "S" pixels.

Stroke element detector 66D is a density detector which examines the pixels within the pixel image of each symbol stroke site. Density detector 66D determines the density of stroke pixels, and compares the stroke pixel density with a predetermined threshold density which must be exceeded in order to detect a symbol stroke element in that symbol stroke site. In a multi-threshold embodiment, each stroke site has end regions and a middle region. The end regions have a predetermined end threshold, and a middle region also has a predetermined middle threshold which is lower than the end threshold. Each threshold must be exceeded in order to detect a symbol stroke element in that symbol stroke site.

Stroke pattern library 60L contains pattern vectors each formed by N binary pattern vector elements. Each pattern vector represents a symbol pattern having N pattern stroke sites corresponding to the N pattern vector elements. Each pattern vector element has one binary state representing a pattern stroke element present in the corresponding pattern stroke site for that pattern vector, and has the other binary state representing a pattern stroke element not present. Each pattern vector is associated with directions for distributing the record data.

Classifier 60C identifies any symbol vector from the stroke element detector which is identical to any pattern vector in the library, to obtain the directions associated with that pattern vector for distributing the record data. Distributer 60D is responsive to the associated directions for distributing the record data into the electronic network 60N.

INDUSTRIAL APPLICABILITY

It will be apparent to those skilled in the art that the objects of this invention have been achieved by providing a method of network distribution of record data involving guide constraints on a transmittal sheet. The guide constraints receive hand entered transmittal symbols which direct the distribution. The guide constraints define individual stroke elements forming the transmittal symbols. The spacing and arrangement of the guide constraints facilitate segmentation of the transmittal symbols prior to classification. The bottom horizontal guide constraints establish a symbol baseline. The method involves detecting the presence or absence of individual stroke elements. The stroke elements form a symbol vector which is compared to pattern vectors in a library. The transmittal symbols define storage parameters for filing and storing the record data. The pixel image on the transmittal sheet is segmented into connected components which are size filtered prior to classification to remove instructional text and other material.

CONCLUSION

Clearly various changes may be made in the structure and embodiments shown herein without departing from the concept of the invention. Further, features of the embodiments shown in the various figures may be employed with the embodiments of the other figures. Therefore, the scope of the invention is to be determined by the terminology of the following claims and the legal equivalents thereof.

I claim as my invention:

1. A method for electronic network distribution of record data, comprising the steps of:

provi­ding record document means containing record data to be electronically distributed;

providing transmittal sheet means carrying hand entered stroke based transmittal symbols for directing the distribution of the record data, which transmittal symbols have been hand entered within pre-existing guide constraints present on the transmittal sheet means, the guide constraints include N stroke sites which establish the position and length and direction of symbol stroke elements entered into at least some of the stroke sites forming the transmittal symbols defining a finite set of transmittal symbol stroke patterns;

scanning the transmittal sheet means and the record document means with a scanning means to obtain an electronic pixel image of the transmittal symbols carried on the transmittal sheet means, the electronic pixel image having foreground pixels forming the symbol stroke elements of the transmittal symbols and background pixels indicating the absence of symbol stroke elements of the transmittal symbols, and to obtain an electronic pixel image of the record data contained in the record document means;

classifying the electronic pixel image of the transmittal symbols using feature based OCR techniques against a library of stroke patterns formed by N possible pattern stroke elements, including at least some stroke patterns of the finite set of transmittal symbol stroke patterns in which the stroke elements are features of the feature based OCR techniques, the library of stroke patterns having a table data structure with locations, each location associated with directions for distributing the record data, each location further associated with at least one of the library stroke patterns, each stroke pattern in the form of a pattern vector having N binary single bit vector elements, one vector element corresponding to each of the N possible pattern stroke elements, and each single bit element of the pattern vector having one binary state if the corresponding possible pattern stroke element is present in the stroke pattern for that location and having the other binary state if the corresponding possible pattern stroke element is not present; and distributing the electronic pixel image of the record data as directed by the classified pixel image of the transmittal symbols.

2. The method of claim 1, wherein the classifying step further comprises the following steps;

detecting whether a hand entered symbol stroke element has been entered into any of the N stroke sites of the transmittal symbol being classified;

providing a symbol vector for the transmittal symbol being classified having N binary single bit vector elements corresponding to the N stroke sites, each single bit element of the symbol vector having one binary state if a symbol stroke element has been entered into the corresponding stroke site of the transmittal symbol being classified and having the other binary state if a symbol stroke element has not been entered; and identifying any pattern vector in the library which is identical to the symbol vector to obtain the directions for distributing the record data.

3. The method of claim 2, wherein:

the finite set of stroke patterns has "C" equal to two to the Nth stroke patterns, and the library of stroke patterns has "C" locations;

the symbol vector for the transmittal symbol being classified is an address into the library of stroke patterns; and during the identifying step the address of the symbol vector is accessed in the table of locations to obtain the directions for distribution.

4. The method of claim 2, wherein
the finite set of stroke patterns has "C" equal to two to the Nth stroke patterns, and the library of stroke patterns has only "P" locations which is less than "C"; and
during the identifying step the symbol vector is compared with the pattern vectors in the library of stroke patterns to obtain the directions for distribution.

5. The method of claim 2, wherein the step of detecting the hand entered symbol stroke elements is accomplished by examining the pixels within each stroke site for a sequence of connected foreground pixels extending a number of pixels "S" in the direction of the stroke site which must be present in order to detect a hand entered symbol stroke element.

6. The method of claim 5, wherein the step of detecting the hand entered symbol stroke elements is accomplished by examining the pixels within each stroke site for background pixels which preclude the sequence of connected foreground pixels extending "S" pixels in the direction of the stroke site.

7. The method of claim 2, wherein the step of detecting the hand entered symbol stroke elements is accomplished by examining the density of foreground pixels within each stroke site, and comparing the foreground density with a predetermined threshold density which must be exceeded in order to detect a hand entered symbol stroke element.

8. The method of claim 7, wherein each stroke site has end regions therein with an end threshold density, and a middle region therein with a middle threshold density which is lower than the end threshold density, each of which must be exceeded in order to detect a hand entered symbol stroke element.

9. Apparatus for distributing electronic record data into an electronic network, comprising:
transmittal sheet carrying hand entered transmittal symbols formed by stroke elements for directing the distribution of the record data;
guide constraints on the transmittal sheet for guiding the hand entry of the transmittal symbols onto the transmittal sheet, each guide constraint having N symbol stroke sites which establish the position and length and direction of symbol stroke elements hand entered into at least some of the N symbol stroke sites to form the transmittal symbol within that guide constraint;
scanner for scanning the symbol stroke sites and the symbol stroke elements entered therein to obtain a pixel image of the transmittal symbols formed by stroke pixels and non-stroke pixels;
stroke element detector for detecting the pixel image of symbol stroke elements entered into any of the N symbol stroke sites, to provide a symbol vector for each guide constraint having N binary single bit symbol vector elements, each vector element corresponding to one of the N symbol stroke sites of that guide constraint, each symbol vector element having one binary state if a pixel image of a symbol stroke element is detected in the corresponding symbol stroke site, and having the other binary state if a pixel image of a symbol stroke element is not detected; and
a stroke pattern library containing pattern vectors each formed by N binary single bit pattern vector elements, each pattern vector representing a symbol pattern having N possible pattern stroke corresponding to the N pattern vector elements, each single bit element of the pattern vector having one binary state representing a pattern stroke element present in that pattern vector, and having the other binary state representing a pattern stroke element not present, each pattern vector associated with directions for distributing the record data;
classifier for identifying any symbol vector from the stroke element detector which is identical to any pattern vector in the library, to obtain the directions associated with that pattern vector for distributing the record data; and
distributer responsive to the associated directions for distributing the record data into the electronic network.

10. The apparatus of claim 9, wherein the stroke element detector is a sequence detector which examines the pixels within the pixel image of each symbol stroke site for a sequence of connected stroke pixels extending at least "S" pixels in the direction of that symbol stroke site, which sequence must be present in order to detect a symbol stroke element in that symbol stroke site.

11. The apparatus of claim 9, wherein the stroke element detector is a sequence detector which examines the pixels within the pixel image of each symbol stroke site for non-stroke pixels which preclude a sequence of connected stroke pixels extending at least "S" pixels in the direction of that symbol stroke site, which sequence must be present in order to detect a symbol stroke element in that symbol stroke site.

12. The apparatus of claim 9, wherein the stroke element detector is a density detector which examines the pixels within the pixel image of each symbol stroke site to determine the density of stroke pixels, and compares the stroke pixel density with a predetermined threshold density which must be exceeded in order to detect a symbol stroke element in that symbol stroke site.

13. The apparatus of claim 12, wherein each stroke site has end regions therein with an end threshold stroke pixel density, and a middle region therein with a middle stroke pixel threshold density which is lower than the end threshold stroke pixel density, each of which must be exceeded in order to detect a symbol stroke element in that symbol stroke site.

14. A method for electronic network distribution of record data, comprising the steps of:
inputting an electronic pixel image of the record data to be electronically distributed and an electronic pixel image of transmittal symbols for directing the distribution of the record data, which transmittal symbols have been hand entered within pre-existing guide constraints present on a transmittal sheet, the guide constraints including N stroke sites which form the transmittal symbols defining a finite set of transmittal symbol stroke patterns, and which establish the position and length and direction of symbol stroke elements entered into at least some of the stroke sites, the electronic pixel image having foreground pixels forming the symbol stroke elements of the transmittal symbols and background pixels indicating the absence of symbol stroke elements;
classifying the electronic pixel image of the transmittal symbols using feature based OCR techniques against a library of stroke patterns formed by N possible pattern stroke elements, the library including at least some stroke patterns of the finite set of transmittal symbol stroke patterns in which the stroke elements are features of the feature based OCR techniques, the library of stroke patterns having a table data structure with locations, each location associated with directions for distributing the record data, each location further associated with at least one of the library stroke patterns, each stroke pattern in the form of a pattern vector having N binary single bit vector elements, one vector element corresponding to each of the N possible pattern stroke elements, and each single bit element of the pattern vector having one binary state if the corresponding possible pattern stroke element is present in the stroke pattern for that location and having the other binary state if the corresponding possible pattern stroke element is not present; and distributing the electronic pixel image of the record data as directed by the classified pixel image of the transmittal symbols.

15. Apparatus for electronic network distribution of record data, comprising:

means for inputting an electronic pixel image of the record data to be electronically distributed and an electronic pixel image of transmittal symbols for directing the distribution of the record data, which transmittal symbols have been hand entered within pre-existing guide constraints present on a transmittal sheet, the guide constraints including N stroke sites which form the transmittal symbols defining a finite set of transmittal symbol stroke patterns, and which establish the position and length and direction of symbol stroke elements entered into at least some of the stroke sites, the electronic pixel image having foreground pixels forming the symbol stroke elements of the transmittal symbols and background pixels indicating the absence of symbol stroke elements;

means for classifying the electronic pixel image of the transmittal symbols using feature based OCR techniques against a library of stroke patterns formed by N possible pattern stroke elements, the library including at least some stroke patterns of the finite set of transmittal symbol stroke patterns in which the stroke elements are features of the feature based OCR techniques, the library of stroke patterns having a table data structure with locations, each location associated with directions for distributing the record data, each location further associated with at least one of the library stroke patterns, each stroke pattern in the form of a pattern vector having N binary single bit vector elements, one vector element corresponding to each of the N possible pattern stroke elements, and each single bit element of the pattern vector having one binary state if the corresponding possible pattern stroke element is present in the stroke pattern for that location and having the other binary state if the corresponding possible pattern stroke element is not present; and means distributing the electronic pixel image of the record data as directed by the classified pixel image of the transmittal symbols.

16. A computer readable medium containing a computer program that distributes record data into an electronic network, by directing the computer to execute the steps of:

inputting an electronic pixel image of the record data to be electronically distributed and an electronic pixel image of transmittal symbols for directing the distribution of the record data, which transmittal symbols have been hand entered within pre-existing guide constraints present on a transmittal sheet, the guide constraints including N stroke sites which form the transmittal symbols defining a finite set of transmittal symbol stroke patterns, and which establish the position and length and direction of symbol stroke elements entered into at least some of the stroke sites, the electronic pixel image having foreground pixels forming the symbol stroke elements of the transmittal symbols and background pixels indicating the absence of symbol stroke elements;

classifying the electronic pixel image of the transmittal symbols using feature based OCR techniques against a library of stroke patterns formed by N possible pattern stroke elements, the library including at least some stroke patterns of the finite set of transmittal symbol stroke patterns in which the stroke elements are features of the feature based OCR techniques, the library of stroke patterns having a table data structure with locations, each location associated with directions for distributing the record data, each location further associated with at least one of the library stroke patterns, each stroke pattern in the form of a pattern vector having N binary single bit vector elements, one vector element corresponding to each of the N possible pattern stroke elements, and each single bit element of the pattern vector having one binary state if the corresponding possible pattern stroke element is present in the stroke pattern for that location and having the other binary state if the corresponding possible pattern stroke element is not present; and distributing the electronic pixel image of the record data as directed by the classified pixel image of the transmittal symbols.

* * * * *